United States Patent Office 3,442,886
Patented May 6, 1969

3,442,886
BENZOTHIAZOLYL-AZO-ANILINE DYESTUFFS CONTAINING AN N-ALKYLENE OXOALKANOATE GROUP
Joseph B. Dickey and Max A. Weaver, Kingsport, Tenn., assignors to Eastman Kodak Company, Rochester, N.Y., a corporation of New Jersey
No Drawing. Filed May 2, 1966, Ser. No. 546,499
Int. Cl. C09b 29/36
U.S. Cl. 260—158    8 Claims

ABSTRACT OF THE DISCLOSURE

Benzothiazolyl-azo-aniline compounds, in which the nitrogen atom of the aniline coupling component is substituted with the group

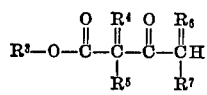

wherein $R^3$ is alkyl and $R^4$, $R^5$, $R^6$ and $R^7$ each is alkyl or phenyl, are useful as dyes for hydrophobic textile materials.

---

This invention relates to novel water insoluble azo compounds useful as dyes for hydrophobic textile fibers, yarns and fabrics.

The azo compounds of the invention are characterized by the general formula (I)   $R-N=N-R^1-N-R^3-Z$
                  $|$
                  $R^2$ wherein R represents a benzothiazolyl radical, i.e. a radical having the structure:

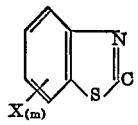

wherein X may be lower alkyl, e.g. methyl; substituted alkyl, e.g. hydroxyethyl; lower alkoxyl, e.g. methoxyl, lower alkylthio, e.g. ethylthio, lower alkylsulfonyl, e.g. methylsulfonyl; substituted alkylsulfonyl, e.g. cyanoethylsulfonyl, hydroxyethylsulfonyl; halogeno, e.g. chloro; sulfamoyl; lower alkylsulfamoyl, e.g. dimethylsulfamoyl; lower alkanoylamino, e.g. acetamido; cyano; nitro and combinations thereof;
$m=0, 1, 2$ or 3;
$R^1$ represents a monocyclic carbocyclic aromatic group of the benzene series having the structure

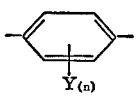

wherein Y represents lower alkyl, e.g. methyl; substituted alkyl, e.g. hydroxyethyl; lower alkoxyl, e.g. methoxyl; lower alkanoylamino, e.g. acetamido; halogeno, e.g. chloro; arylamino, e.g. phenylamino and combinations thereof;
$n=0, 1, 2$ or 3;
$R^2$ represents hydrogen; an alkyl radical including nonsubstituted alkyl, preferably lower alkyl, i.e. from 1 to 4 carbon atoms, and substituted alkyl such as cyanoalkyl, e.g. cyanoethyl, halogenoalkyl, e.g. chloroethyl, carbalkoxyalkyl, e.g. carbomethoxyethyl, alkylsulfonylalkyl, e.g. methylsulfonylethyl; alkoxyalkyl, e.g. methoxyethyl or $R^2$ represents a monocyclic carbocyclic aromatic group of the benzene series, e.g. phenyl; or $R^2$ may represent $R_3$-Z;
$R^3$ represents an alkylene radical, preferably lower alkylene of 2 to 4 carbon atoms and may be nonsubstituted or substituted alkylene such as 2-chloromethylethylene, 2-methoxymethylethylene, etc.;
Z represents a radical having the structure

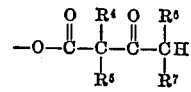

wherein $R^4$, $R^5$, $R^6$ and $R^7$ may be the same or different and represent hydrogen or an alkyl or alkenyl radical of from 1 to 8 carbon atoms or a monocyclic carbocyclic aromatic group of the benzene series, e.g. phenyl.

As will be seen from the examples given below, the substituents on $R^2$ and $R^3$ and the substituents designated as X and Y, above, serve primarily as auxochrome groups to control the color of the azo compound.

The azo compounds of the invention are prepared by coupling a diazonium salt of an aminobenzothiazole compound having the formula (II)    $R-NH_2$ with a β-keto ester coupling component having the formula
(III)

wherein R, $R^1$, $R^2$, $R^3$, $R^4$, $R^5$, $R^6$ and $R^7$ are defined above.

The compounds of Formula III may be prepared by the following known methods:

A. Reaction of N-hydroxyalkylaniline compounds with tetraalkyl-1,3-cyclobutanediones

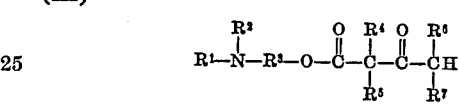

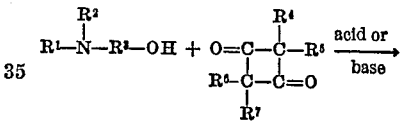

B. Reaction of N-hydroxyalkylaniline compounds with β-lactones of 2,2,4,4-tetraalkyl-3-hydroxy-3-butenoic acids

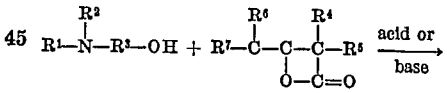

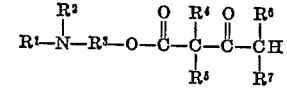

wherein $R^1$, $R^2$, $R^3$, $R^4$, $R^5$, $R^6$ and $R^7$ are defined above.

The azo compounds of the invention are used for dyeing textile materials, including synthetic polymer fibers, yarns and fabrics, shades of red which are extremely fast to light and sublimation and further, have excellent fastness to washing and gas (atmospheric fumes).

The following examples will serve to illustrate the preparation of representative couplers and azo compounds of the invention.

PREPARATION OF THE COUPLERS

Preparation of 2-(N-ethyl-m-toluidino)ethyl-2,2,4-trimethyl-3-oxovalerate

An amount of 2 g. 50% NaH (mineral oil dispersion) was added to 179 g. N - ethyl - N - β - hydroxyethyl - m-toluidine with stirring. After some foaming had subsided, 140 g. 2,2,4,4 - tetramethyl - 1,3 - cyclobutanedione was added portionwise at such a rate that the reaction temperature did not exceed 75° C. The reaction mixture was stirred 30 min. at approximatedly 50° C., after which it was allowed to cool to room temperature. After acidification with 5 ml. of conc. HCl, the reaction mixture was washed with water, and distilled in vacuo to give 228.3 g. of product boiling at 154–157° C. at .8 mm., $n_D^{20}$—1.5109. The compound had the structure:

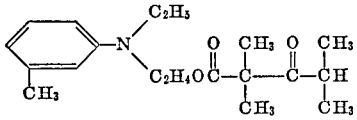

This compound may also be prepared in good yield from N-ethyl-N-β-hydroxyethyl-m-toluidine and 2,2,4,4-tetramethyl-3-hydroxy-3-botenoic acid β-lactone under essentially the same conditions.

Preparation of 2,2'-m'toluidinodiethanol bis (2,2,4-trimethyl-3-oxovalerate)

To 97.5 g. 2,2'-m-toluidinodiethanol was added 2 g. 50% sodium hydride (mineral oil dispersion) with stirring. After the foaming subsided, 140 g. 2,2,4,4-tetramethyl-1,3-cyclobutanedione was added portionwise at less than 95° C. External cooling was required. The mixture was stirred 2 hr. longer, allowing to cool to room temperature. After acidification with 5 ml. conc. HCl, the reaction mixture was washed with water, and distilled in vacuo to give 133.5 g. product which boiled 190–207° C. (0.8–1.8 mm.), $n_D^{20}$—1.4947–1.4962. The product had the following structure:

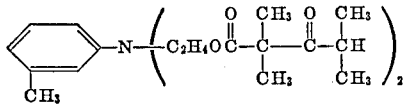

Preparation of 2-(N-2-cyanoethylanilino)ethyl-2,4-diethyl-2-methyl-3-oxovalerate To 38.0 g. N-β-cyanoethyl-N-β-hydroxyethylaniline was added 2 g. 50% NaH (mineral oil dispersion) with stirring. Some foaming occurred. 33.6 g. 2,4-diethyl-2,4-dimethyl-1,3-cyclobutanedione was added portionwise with stirring at less than 90° C. After about one half of the material had been added an additional .5 g. 50% NaH was introduced. The reaction mixture was stirred 2 hr. longer, allowing to cool to room temperature. To the reaction mixture was added 5 ml. conc. HCl and then 200 ml. water. After stirring about 1 hr. the product was extracted with 2–75 ml. portions of chloroform, washed with water, and dried over anhydrous sodium sulfate. Removal of the chloroform under vacuum gave 69.0 g. of product, which had the following structure:

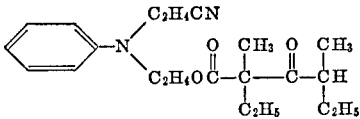

In the manner described above, all of the couplers subsequently described were prepared by reacting the appropriate N-hydroxyalkylaniline with 2,2,4,4-tetraalkyl-1,3-cyclobutanediones or 2,2,4,4-tetraalkyl-3-hydroxy-3-butenoic acids. Alternative methods for reacting ketene dimers with alcohols are described in the literature.

PREPARATION OF THE DYES

Example 1

An amount of 6.84 g. 2-amino-6-methylsulfonylbenzothiazole was stirred in 72 ml. water and 42.8 ml. conc. sulfuric acid was added. The mixture was cooled and a solution of 2.52 g. NANO$_2$ in 15 ml. conc. sulfuric acid was added portionwise below 0° C. The diazotization was stirred for 2 hr. at about 0° C., then added to a solution of 9.57 g. 2-(N-ethyl-m-toluidino)ethyl-2,2,4-trimethyl-3-oxovalerate dissolved in 200 ml. 15% H$_2$SO$_4$, all at about 5° C. The mixture was allowed to couple 2 hr. at ice-bath temperature, drowned, filtered, washed with water and air dried. The product dyed cellulose acetate and polyester fibers a brilliant red shade with excellent fastness properties and had the following structure:

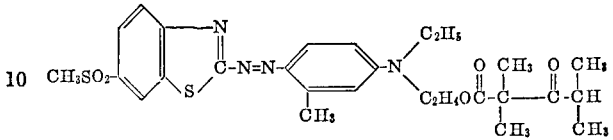

Example 2

An amount of 0.76 g. sodium nitrite was added portionwise to 5 ml. conc. sulfuric acid. This solution was cooled in an ice-bath and 10 ml. 1:5 acid (1 part propionic: 5 parts acetic) was added, keeping the temperature below 15° C. This mixture was stirred at 0–5° C. and 1.75 g. 2-amino-6-cyanobenzothiazole was added at 0–5° C., followed by 10 ml. 1:5 acid. The diazotization was stirred at 0–5° C. for 2 hr. and then added to a cold solution of 3.05 g. of 2-(N-ethylanilino)ethyl 2,2,4-trimethyl-3-oxovalerate in 100 ml. 1:5 acid. The coupling was buffered with solid ammonium acetate and allowed to react at ice-bath temperature for 2 hr. It was then drowned with water, filtered, washed with water, and air dried. The product dyed cellulose acetate and polyester fibers deep red shades of excellent fastness. It had the following structure:

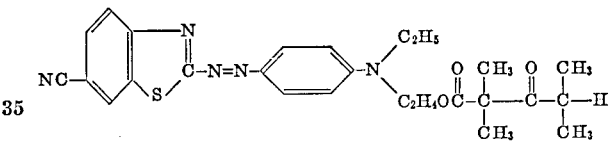

Example 3

An amount of 1.95 g. 2-amino-6-nitrobenzothiazole was suspended in 24 ml. water. To this was added with stirring, 14 ml. conc. H$_2$SO$_4$. The solution was cooled to −5° C. and a solution of 0.72 g. NaNO$_2$ in 5 ml. conc. H$_2$SO$_4$ was added at less than 0° C. After stirring at about 0° C. for 2 hr. the solution was added to a solution of 3.19 g. 2-(N-ethyl-m-toluidino)ethyl-2,2,4-trimethyl-3-oxovalerate in 50 ml. 15% H$_2$SO$_4$, all at about 5° C. The mixture was allowed to couple 1 hr. at ice-bath temperature, drowned with water, filtered, washed with water, and air dried. The product dyed cellulose acetate and polyester fibers brilliant shades of violet with good fastness properties. It had the following structure:

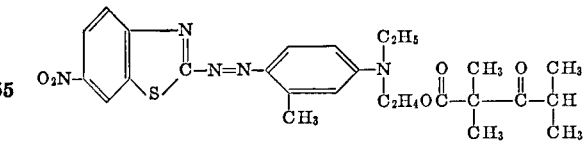

Example 4

An amount of 1.75 g. 2-amino-6-cyanobenzothiazole was diazotized as in Example 2 and the solution added to a cold solution of 3.19 g. 2-(N-ethyl-m-toluidino) ethyl-2,2,4-trimethyl-3-oxovalerate in 100 ml. 1:5 acid. The coupling was buffered with ammonium acetate and allowed to couple 2 hr. at ice-bath temperature. It was then drowned with water, filtered, washed with water, and air dried. The product dyed cellulose acetate and polyester fibers deep shades of red and had the following structure:

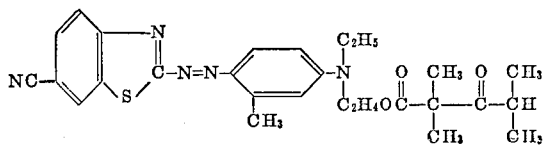

TABLE

| Example No. | X | Y | R² | R³ | R⁴ | R⁵ | R⁶ | R⁷ | Color |
|---|---|---|---|---|---|---|---|---|---|
| 8 | 6-CH₃SO₂ | 3-CH₃ | —CH₃ | —CH₂CH₂— | —CH₃ | —CH₃ | —CH₃ | —CH₃ | Red. |
| 9 | 6-CH₃SO₂ | 3-CH₃ | —C₂H₄CN | —CH₂CH₂CH₂— | —CH₃ | —CH₃ | —CH₃ | —CH₃ | Red. |
| 10 | 6-CH₃SO₂ | 3-CH₃ | —C₂H₄Cl | —CH₂—CH—CH₂—<br>          CH₃ | —CH₃ | —CH₃ | —CH₃ | —CH₃ | Red. |
| 11 | 6-CH₃SO₂ | None | —C₂H₄Br | —CH₂—CH—CH₂— | —CH₃ | —CH₃ | —CH₃ | —CH₃ | Red. |
| 12 | 6-CH₃SO₂ | None | —C₂H₅ | —CH₂CH₂— | —C₂H₅ | —C₂H₅ | —C₂H₅ | —C₂H₅ | Red. |
| 13 | 6-NO₂ | 3-CH₃ | —C₂H₅ | —CH₂CH₂— | H | H | H | H | Violet. |
| 14 | 6-NO₂ | 3-OCH₃ | —C₂H₅ | —CH₂CH₂— | —C₃H₇-n | —C₃H₇-n | —C₃H₇-n | C₂H₅ | Do. |
| 15 | 6-NO₂ | 3-OCH₃ | —C₂H₅ | —CH₂CH₂— | —CH₃ | —CH₃ | —CH₃ | —CH₃ | Do. |
| 16 | 6-NO₂ | 3-NHCOCH₃ | —C₂H₅ | —CH₂CH₂— | —CH₃ | —CH₃ | —CH₃ | —CH₃ | Do. |
| 17 | 6-NO₂ | 2-OCH₃ | —C₂H₅ | —CH₂CH₂— | —CH₃ | —CH₃ | —CH₃ | —CH₃ | Do. |
| 18 | 6-CN | 3-Cl | —C₂H₅-n | —CH₂CH₂— | —C₆H₅ | —C₆H₅ | —C₆H₅ | —C₆H₅ | Red. |
| 19 | 6-CN | 2-Cl | H | —CH₂CH₂— | —CH₃ | —CH₃ | —CH₃ | —CH₃ | Scarlet. |
| 20 | 6-CN | 2-Cl | —CH₂OCOCH₃ | —CH₂CH₂— | —CH₃ | —CH₃ | —CH₃ | —CH₃ | Do. |
| 21 | 6-CN | 3-CH₃ | —C₂H₄OCOCH₃ | —CH₂CH₂— | —CH₃ | —CH₃ | —CH₃ | —CH₃ | Red. |
| 22 | 6-CN | 3-CH₃ | —C₂H₄SO₂CH₃ | —CH₂CH₂— | —CH₃ | —CH₃ | —CH₃ | —CH₃ | Red. |
| 23 | 6-CN | None | —C₂H₄OH | —CH₂CH₂— | —CH₃ | —CH₃ | —C₆H₅ | —C₆H₅ | Red. |
| 24 | 6-CN | None | —C₂H₅ | —CH₂CH₂— | —C₆H₅ | —C₆H₅ | —C₆H₅ | —C₆H₅ | Red. |
| 25 | 6-CN | 2,5-di-OCH₃ | —C₂H₅ | —CH₂CH₂— | —CH₃ | —CH₃ | —CH₃ | —CH₃ | Violet. |
| 26 | 6-CN | 3-CH₃ | —C₂H₄OCH₃ | —CH₂CH₂— | —CH₃ | —CH₃ | —CH₃ | —CH₃ | Red. |
| 27 | 6-SO₂CH₃ | 3-CH₃ | —R₃—O—C—C—O—CH—R₇<br>         ‖ R₄  R₆<br>         O R₅ | —CH₂CH₂— | —CH₃ | —CH₃ | —CH₃ | —CH₃ | Red. |
| 28 | 6-SO₂CH₃ | None | —R₃—O—C—C—O—CH—R₇<br>         ‖ R₄  R₆<br>         O R₅ | —CH₂CH₂— | —CH₃ | —CH₃ | —CH₃ | —CH₃ | Red. |
| 29 | 6-OCH₃ | 3-CH₃ | —C₂H₅ | —CH₂—CH₂— | —CH₃ | —CH₃ | —CH₃ | —CH₃ | Red. |
| 30 | 6-CH₃ | 3-CH₃ | —C₂H₅ | —CH₂—CH₂— | —CH₃ | —CH₃ | —CH₃ | —CH₃ | Red. |
| 31 | 6-Cl | 3-CH₃ | —C₂H₅ | —CH₂—CH₂— | —CH₃ | —CH₃ | —CH₃ | —CH₃ | Red. |
| 32 | 6-NHCOCH₃ | 3-CH₃ | —C₂H₅ | —CH₂—CH₂— | —CH₃ | —CH₃ | —CH₃ | —CH₃ | Red. |
| 33 | 6-SO₂N(CH₃)₂ | 3-CH₃ | —C₂H₅ | —CH₂—CH₂— | —CH₃ | —CH₃ | —CH₃ | —CH₃ | Red. |
| 34 | 6-SO₂NH₂ | 3-CH₃ | —C₆H₅ | —CH₂—CH₂— | —CH₃ | —CH₃ | —CH₃ | —CH₃ | Red. |
| 35 | 6-S—CH₃ | 3-CH₃ | —C₆H₅ | —CH₂—CH₂— | —CH₃ | —CH₃ | —CH₃ | —CH₃ | Red. |
| 36 | 4-NO₂—6-SO₂CH₃ | 3-CH₃ | —C₂H₄CN | —CH₂—CH₂— | —CH₃ | —CH₃ | —CH₃ | —CH₃ | Red. |
| 37 | 4-NO₂—6-SO₂CH₃ | 3-CH₃ | —C₂H₅ | —CH₂—CH₂— | —CH₃ | —CH₃ | —CH₃ | —CH₃ | Violet. |
| 38 | 4-Br—6-SO₂CH₃ | 3-CH₃ | —C₂H₅ | —CH₂—CH₂— | —CH₃ | —CH₃ | —CH₃ | —CH₃ | Do. |
| 39 | 4-NO₂—6-SO₂C₂H₄CN | 3-CH₃ | —C₂H₅ | —CH₂—CH₂— | —CH₂CH=CH₂— | —CH₂CH=CH₂— | —CH₂CH=CH₂— | —CH₃ | Do. |
| 40 | 6-SO₂C₂H₄OH | 3-CH₃ | —C₂H₅ | —CH₂CH₂— | —C₇H₁₅-n | —C₇H₁₅-n | —C₇H₁₅-n | —C₇H₁₅-n | Red. |
| 41 | 6-SO₂C₂H₅-n | 3-CH₃ | —C₂H₅ | —CH₂CH₂— | 1-Butyl | 1-Butyl | 1-Butyl | 1-Butyl | Red. |
| 42 | 6-CH₃—4-NO₂ | 3-CH₃ | —C₂H₅ | —CH₂CH₂— | —CH₃ | —CH₃ | —CH₃ | —CH₃ | Red. |
| 43 | 4,6-dichloro | 3-CH₃ | —C₂H₅ | —CH₂CH₂— | —C₆H₅ | —C₆H₅ | —C₆H₅ | —C₆H₅ | Red. |
| 44 | None | 3-CH₃ | —C₂H₅ | —CH₂CH₂— | —CH₃ | —CH₃ | —CH₃ | —CH₃ | Red. |
| 45 | 6-SO₂CH₃ | 3-CH₃ | —C₂H₅ | —CH₂CH₂— | —CH₃ | —CH₃ | —CH₃ | —CH₃ | Red. |
| 46 | 6-SO₂CH₃ | 3-CH₃ | —C₂H₅ | —CH₂CH₂— | —CH₃ | —CH₃ | —CH₃ | —CH₃ | Red. |
| 47 | 6-SO₂CH₃ | 3-CH₃ | —C₂H₅ | —CH₂—CH—<br>        CH₂Cl | —CH₃ | —CH₃ | —CH₃ | —CH₃ | Red. |
| 48 | 6-NO₂ | 3-CH₃ | —C₂H₅ | —CH₂—CH—<br>        CH₂OCH₃ | —CH₃ | —CH₃ | —CH₃ | —CH₃ | Violet. |
| 49 | 6-NO₂ | None | —C₂H₅ | —CH₂—CH—<br>        CH₂Cl | —CH₃ | —CH₃ | —CH₃ | —CH₃ | Do. |

Example 5

An amount of 6.84 g. 2-amino-6-methylsulfonylbenzothiazole was diazotized as in Example 1, and added to a cold solution of 10.3 g. of 2-(N-2-cyanoethyl-m-toluidino)ethyl-2,2,4-trimethyl-3-oxovalerate in 200 ml. 15% H₂SO₄, all at about 5° C. The mixture was allowed to couple 2 hr. at ice-bath temperature, drowned with water, filtered, washed with water, and air dried. The produce dyed polyester fibers a bright red shade and had the following structure:

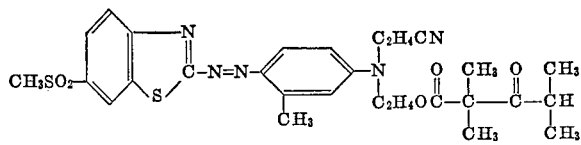

Example 6

An amount og 6.84 g. 2-amino-6-methylsulfonylbenzothiazole was diazotized as in Example 1 and added to a solution of 9.15 g. 2-(N-ethylanilino)ethyl-2,2,4-trimethyl-3-oxovalerate in 200 ml. 15% H₂SO₄, all at about 5° C. The mixture was allowed to couple 2 hr. at ice-bath temperature and then drowned with water. The product was collected by filtration, washed well with water, and air dried. It dyed cellulose acetate and polyester fibers bright shades of red and had the following structure:

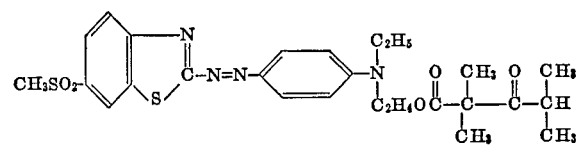

The azo compounds of the table supra were prepared as illustrated in Examples 1 through 7. Thus the compounds represented by Formula II were coupled with the compounds of Formula III to obtain the dyes having the general Formula I above.

The azo compounds of the invention can be used for dyeing textile material, including protein and synthetic polymer fibers, yarns and fabrics, giving a variety of fast red shades when applied thereto by conventional dye methods. The azo compounds have high affinity for cellulose ester, polyester and nylon fibers. When the azo compounds are used for dyeing such hydrophobic materials, they should be free of water-solubilizing groups such as sulfo and carboxyl. In general, the dyes have excellent fastness, for example, to light, washing, gas (atmospheric fumes) and sublimation. The dyes are outstandingly light fast and sublimation resistant on polyester fibers.

As described above, the present azo compounds have the characteristic structure of Formula I. This distinctive structure imparts unexpected properties to the azo compounds, including the above-described light fastness and affinity for protein and synthetic polymer fibers, yarns and fabrics. Thus, the compounds of the invention can, in general, be expected to be superior to similar but distinct dyes when tested by methods such as described in the A.A.T.C. Technical Manual, 1964 edition, depending in part upon the particular dye used and the fiber being dyed.

The azo compounds of the invention can be used for dyeing hydrophobic fibers such as linear polyester, cellulose ester, acrylic polyamide, etc., fibers in the manner described in U.S. Patents 2,880,050, 2,757,064, 2,782,187 and 2,043,827. The following example illustrates a method by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of the invention have varying utility as dyes. The degree of utility varies, for example, depending upon the material being dyed and the formula of the azo compound. Thus, for example, all the dyes will not have the same degree of utility for the same material. For example, the substituents X and Y and the substituent on the R² and R³ radicals, as mentioned above, serve primarily as auxochrome groups to control the color of the azo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the azo compounds.

What we claim is:

1. An azo compound having the formula

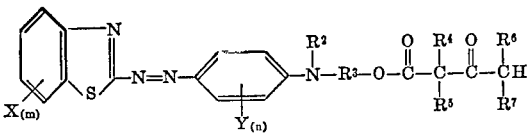

wherein

X is lower alkyl, lower alkoxyl, lower alkylthio, lower alkylsulfonyl, lower cyanoalkylsulfonyl, lower hydroxyalkylsulfonyl, chlorine, bromine, sulfamoyl, lower alkylsulfamoyl, lower alkanoylamino, cyano, or nitro;

$m$ is 0, 1 or 2;

Y is lower alkyl, lower alkoxyl, chlorine, bromine, or lower alkanoylamino;

$n$ is 0, 1 or 2;

R² is hydrogen; lower alkyl; lower alkyl substituted with cyano, chlorine, bromine, lower carbalkoxy, lower alkylsulfonyl, lower alkoxy, or acetoxy; phenyl; or the group

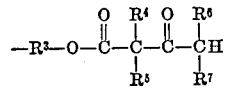

R³ is lower alkylene or lower alkylene substituted with chlorine or methoxy; and R⁴, R⁵, R⁶ and R⁷ each is alkyl of 1 to 8 carbon atoms or phenyl.

2. A compound according to claim 1 having the formula

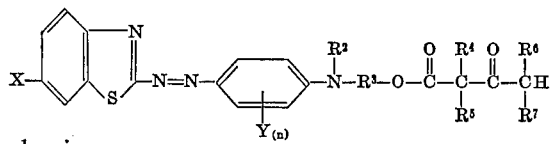

wherein
X is lower alkylsulfonyl, cyano or nitro;
Y is lower alkyl, lower alkoxy, chlorine, bromine, or lower alkanoylamino;
$R^2$ is lower alkyl or lower alkyl substituted with cyano, chlorine, bromine, or acetoxy;
$R^3$ is ethylene or propylene; and
$R^4$, $R^5$, $R^6$ and $R^7$ each is methyl.

3. An azo compound as defined in claim 1 having the formula

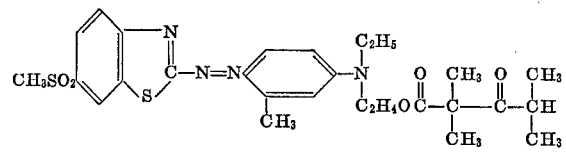

4. An azo compound as defined in claim 1 having the formula

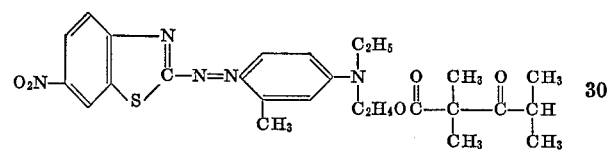

5. An azo compound as defined in claim 1 having the formula

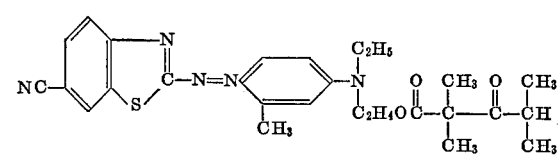

6. An azo compound as defined in claim 1 having the formula

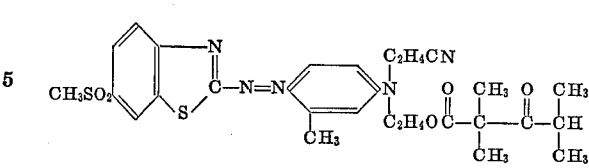

7. An azo compound as defined in claim 1 having the formula

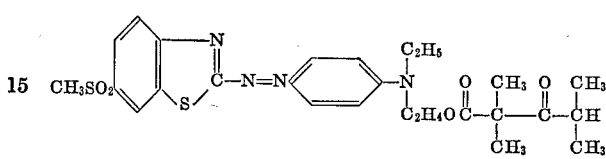

8. An azo compound as defined in claim 1 having the formula

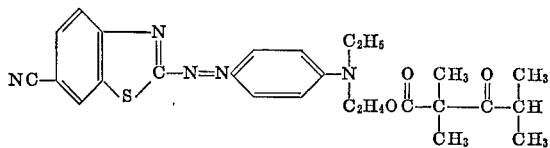

References Cited

UNITED STATES PATENTS

| | | | |
|---|---|---|---|
| 3,097,198 | 7/1963 | Fishwick et al. | 260—158 XR |
| 3,280,101 | 10/1966 | Straley et al. | 260—158 |
| 3,335,125 | 8/1967 | Illy | 260—158 |
| 3,342,800 | 9/1967 | Towle et al. | 260—158 |

FLOYD D. HIGEL, *Primary Examiner.*

U.S. Cl. X.R.

8—4, 41, 50; 117—141, 144; 260—305, 343.9, 465, 477, 483, 573, 586